United States Patent
Krishna et al.

(10) Patent No.: US 10,216,943 B2
(45) Date of Patent: Feb. 26, 2019

(54) DYNAMIC SECURITY QUESTIONS IN ELECTRONIC ACCOUNT MANAGEMENT

(71) Applicant: International Business Machines Corporation, Armonk, NY (US)

(72) Inventors: Hariharan Krishna, Hyderabd (IN); Arun Ramakrishnan, Tamil Nadu (IN); Ashrith Shetty, Karnataka (IN); Rohit Shetty, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/972,145

(22) Filed: Dec. 17, 2015

(65) Prior Publication Data

US 2017/0177881 A1 Jun. 22, 2017

(51) Int. Cl.
*G06F 21/31* (2013.01)
*G06F 21/60* (2013.01)
*H04L 29/06* (2006.01)

(52) U.S. Cl.
CPC ............ *G06F 21/604* (2013.01); *G06F 21/31* (2013.01); *H04L 63/08* (2013.01); *H04L 63/10* (2013.01); *H04L 63/20* (2013.01); *G06F 2221/2131* (2013.01)

(58) Field of Classification Search
CPC . G06F 21/604; G06F 17/30589; H04L 63/10; H04L 63/20
See application file for complete search history.

(56) References Cited

U.S. PATENT DOCUMENTS

| | | | |
|---|---|---|---|
| 5,774,525 A | * | 6/1998 | Kanevsky ............... G06F 21/31 379/188 |
| 6,094,721 A | | 6/2000 | Eldridge et al. |
| 6,209,104 B1 | | 3/2001 | Jalili |
| 6,643,784 B1 | | 11/2003 | McCulligh |
| 6,678,707 B1 | | 1/2004 | Butler |
| 7,093,282 B2 | | 8/2006 | Hillhouse |

(Continued)

FOREIGN PATENT DOCUMENTS

KR 1020070075642 A 7/2007

OTHER PUBLICATIONS

Hayashi et al., "CASA: Context-Aware Scalable Authentication", Retrieved from http://www.cs.cmu.edu/~ehayashi/papers/soups2013_casa.pdf, Published Jul. 2013, pp. 1-11.

(Continued)

*Primary Examiner* — Saleh Najjar
*Assistant Examiner* — Louis C Teng
(74) *Attorney, Agent, or Firm* — Anthony R. Curro

(57) ABSTRACT

Dynamic security questions. In an embodiment of the invention, a security question and one or more rules for generating an answer to the security question are received. The security question and the rules for generating and answer to the security question are associated with security credentials of a user. For authentication, a first answer to a security question associated with a user is received. One or more rules for generating an answer to the security question are retrieved. A second answer to the security question is generated, based on the retrieved rules. The first answer is compared with the second answer, and the user is authenticated, based on the first answer matching the second answer.

18 Claims, 7 Drawing Sheets

(56) References Cited

U.S. PATENT DOCUMENTS

| | | | |
|---|---|---|---|
| 7,171,564 B2 | 1/2007 | Kelley | |
| 7,386,731 B2 | 6/2008 | Sanai et al. | |
| 7,523,318 B2 | 4/2009 | Goal | |
| 7,552,469 B2 | 6/2009 | Diffie et al. | |
| 7,761,384 B2 | 7/2010 | Madhogarhia | |
| 7,890,768 B2 | 2/2011 | Singh | |
| 7,899,753 B1 | 3/2011 | Everhart | |
| 7,904,946 B1 | 3/2011 | Chu | |
| 7,873,995 B2 | 11/2011 | Bagga et al. | |
| 8,239,677 B2* | 8/2012 | Colson | G06F 21/34 705/51 |
| 8,311,190 B2 | 11/2012 | Caceres et al. | |
| 8,739,278 B2* | 5/2014 | Varghese | G06F 21/31 726/22 |
| 8,756,650 B2* | 6/2014 | Wolfson | H04L 63/08 726/1 |
| 8,856,904 B2 | 10/2014 | Chougle | |
| 8,954,738 B2 | 2/2015 | Asokan et al. | |
| 9,218,480 B2 | 12/2015 | Fakhrai et al. | |
| 2003/0037262 A1 | 2/2003 | Hillhouse | |
| 2006/0036553 A1* | 2/2006 | Gupta | G06Q 20/02 705/52 |
| 2006/0143450 A1 | 6/2006 | Airody Udupa et al. | |
| 2006/0248344 A1 | 11/2006 | Yang | |
| 2007/0186115 A1 | 8/2007 | Gao et al. | |
| 2007/0250920 A1 | 10/2007 | Lindsay | |
| 2008/0109472 A1* | 5/2008 | Underwood | G06F 17/3089 |
| 2009/0089869 A1* | 4/2009 | Varghese | G06F 21/31 726/7 |
| 2009/0282258 A1 | 11/2009 | Burke et al. | |
| 2010/0146600 A1* | 6/2010 | Eldar | G06F 21/6218 726/5 |
| 2011/0225625 A1* | 9/2011 | Wolfson | H04L 63/08 726/1 |
| 2012/0137340 A1* | 5/2012 | Jakobsson | G06F 21/316 726/1 |
| 2012/0151566 A1 | 6/2012 | Lin et al. | |
| 2012/0167225 A1* | 6/2012 | Gomez | G06F 21/46 726/26 |
| 2013/0227661 A1 | 8/2013 | Gupta et al. | |
| 2013/0239192 A1* | 9/2013 | Linga | G06F 21/44 726/7 |
| 2013/0318580 A1 | 11/2013 | Gudlavenkatasiva et al. | |
| 2013/0318596 A1 | 11/2013 | Huang et al. | |
| 2014/0244511 A1 | 8/2014 | Weller et al. | |
| 2014/0330618 A1* | 11/2014 | Wong | G06Q 30/0203 705/7.32 |
| 2015/0033303 A1 | 1/2015 | ValBlon et al. | |
| 2015/0172294 A1* | 6/2015 | Bittner | G06F 21/6245 726/4 |
| 2016/0080366 A1* | 3/2016 | Agarwal | H04L 63/0838 726/6 |
| 2017/0103050 A9* | 4/2017 | Underwood | G06F 17/2247 |

OTHER PUBLICATIONS

Preuveneers et al., "SmartAuth: Dynamic Context Fingerprinting for Continuous User Authentication", Retrieved from http://pdfs.semanticscholar.org/3797/e0c78368bf099e93f5e96230893923cf3f48.pdf, published Apr. 2015, pp. 1-7.

Assurance Technologies, LLC, "Passlib Documentation Release 1.6.2", https://media.readthedocs.org/pdf/passlib/1.6.2/passlib.pdf, Jul. 23, 2015, pp. 1-99.

Diaz-Tellez et al., "Context-Aware Multifactor Authenication Based on Dynamic Pin", IFIP Advances in AICT, vol. 428, 2014, pp. 330-338.

http://en.wikipedia.org/wike/Knowledge-based_authentication, "Knowledge-based Authentication", printed Nov. 20, 2015, 4 pages.

Threatmetrix, "Context-Based Authentication", White Paper, Copyright 2014, 10 pages.

Mell et al., "The NIST Definition of Cloud Computing", National Institute of Standards and Technology, Special Publication 800-145, Sep. 2011, pp. 1-7.

https://play.google.com/store/apps/details?id=com.newwave.comtimepasswordlockfree, "Screen Lock-Time Password", New Wave Studio, Apr. 14, 2015, pp. 1-3.

Groff, "Crytographically Random Password Generator", CodeGuru.com, Published Dec. 12, 2007, Retrieved From http://www.codeguru.com/csharp/csharp/cs_misc/security /article.

* cited by examiner

DYNAMIC SECURITY QUESTIONS IN ELECTRONIC ACCOUNT MANAGEMENT

BACKGROUND

Embodiments of the invention relate generally to information security, and more particularly to automatic generation and use of security questions and answers in electronic account management.

Electronic information is often accessed using security credentials such as passwords. Maintaining password security in light of increasing threats is a challenge. One common way to increase password security is to require users to select passwords having a minimum strength requirement, for example, at least 8 characters, at least one number, at least one uppercase letter, and/or at least one special character. However, methods exist that may defeat such passwords, including brute force attacks, social engineering, remote access tools (RATs) and keyloggers, phishing, and rainbow tables. An additional layer of security may be added by requiring users to select one or more security questions and answers. Security questions also allow users to recover access to accounts if a password is lost or forgotten, and help protect them against suspicious logins.

SUMMARY

Embodiments of the present invention disclose a computer-implemented method, system, and computer program product for generating and authenticating an answer to a dynamic security question.

In an embodiment of the invention, a security question and one or more rules for generating an answer to the security question are received. The security question and the rules for generating and answer to the security question are associated with security credentials of a user.

In another embodiment of the invention, a first answer to a security question associated with a user is received. One or more rules for generating an answer to the security question are retrieved. A second answer to the security question is generated, based on the retrieved rules. The first answer is compared with the second answer, and the user is authenticated, based on the first answer matching the second answer.

DETAILED DESCRIPTION

Security questions, also known as secret or personal knowledge questions, have long been used as a backup mechanism to reclaim lost accounts. However, simple security questions, while easy to remember, tend to be easy for an attacker to bypass, since the answers are often either contained in a small pool of potential answers (e.g., favorite food), or may be publicly available on social media. More complex security questions, or questions with intentionally incorrect answers, may be avoided by users since they are harder to recall. A security question approach that goes beyond static security questions would provide added protection from security breaches.

Dynamic security questions allow a user to configure both security questions and answers so that they vary according to predefined rules, or policies. For example, rather than having a single, static answer to a security question, the answer may be contextual or dynamic. The context or the dynamic nature of the answer may be specified by the user when the user configures the security question. This may increase the complexity of the security question and make it more difficult for a hacker to guess the answer to the security question. Alternatively, the security question itself may vary according to predefined rules, depending, for example, on contextual user information.

An advantage of this method is that, while the complexity of the security questions increases, making it more difficult for a hacker to guess the answer, the memorability of the answers may still remain high. This allows for security questions to be used as a secondary authentication method, in addition to the password that users are typically required to provide.

Embodiments of the present invention disclose a computer-implemented method, computer program product, and system for dynamic security question generation and use. A user establishes one or more dynamic security questions, based on one or more respective rules. The security questions and the rules are associated with the user and stored in a datastore. For user authentication, the user is presented with the security questions. The user enters answers that may comply with the rules. A server process that performs user authentication receives the answers from the user, retrieves the stored rules from the security question datastore and generates answers to the security questions, based on the rules. If the answers entered by the user and the answers generated by the server process match, the user is authenticated and may be granted access to an account, or may be provided with options to reset or recover a password.

Figure 1:
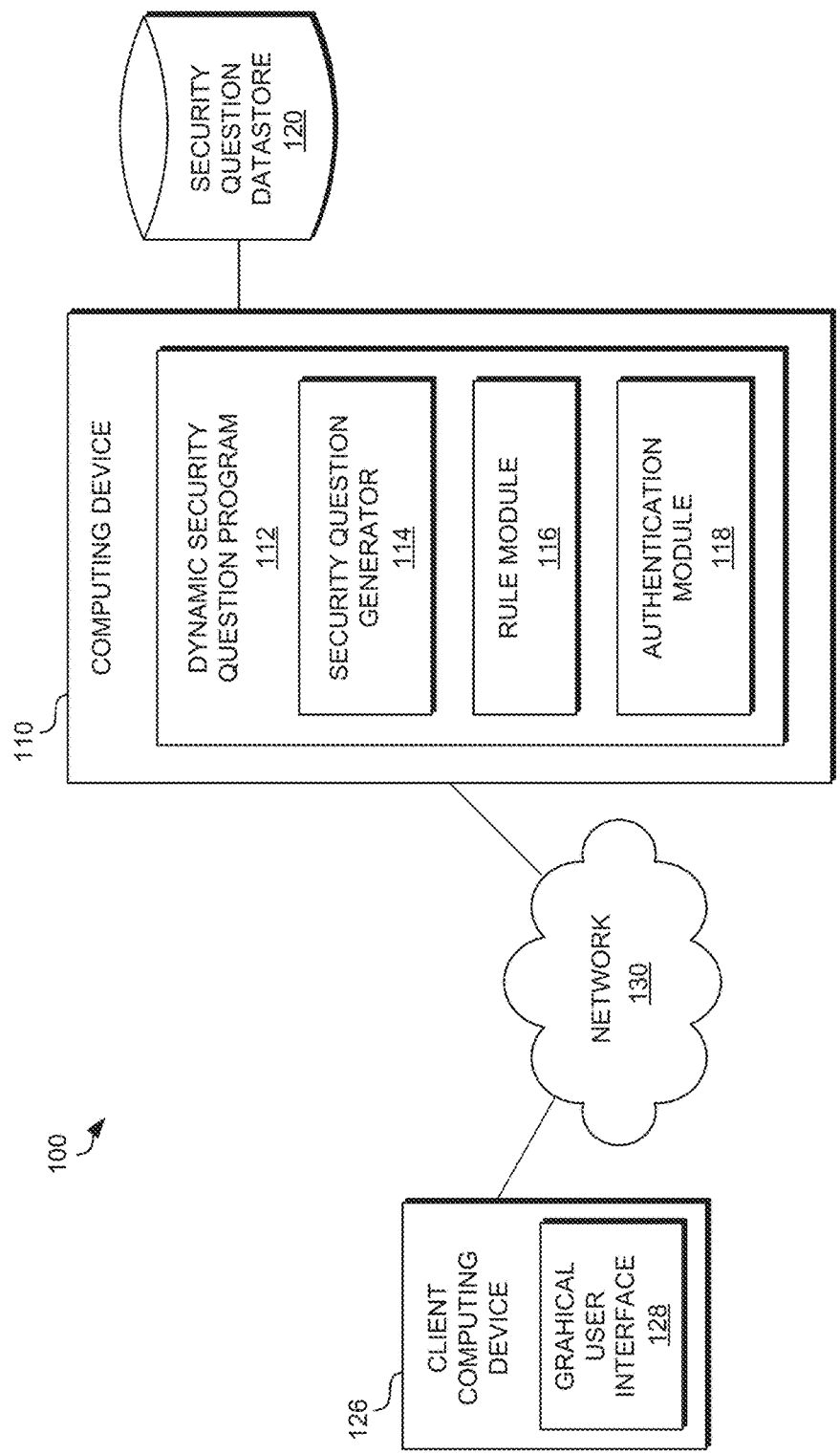
FIG. 1 is a functional block diagram of a dynamic security question system, in accordance with an embodiment of the present invention.

FIG. 1 is a functional block diagram of a dynamic security question system 100, in accordance with an embodiment of the present invention. Dynamic security question system 100 includes computing device 110, shown hosting dynamic security question program 112, security question datastore 120, and client computing device 126, all interconnected over a network 130. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing device 110 represents the computing environment or platform that hosts dynamic security question program 112. In various embodiments, computing device 110 may be a laptop computer, netbook computer, personal computer (PC), a desktop computer, or any programmable electronic device capable of hosting dynamic security question program 112, described below, and communicating with client computing device 126 via network 130, in accordance with embodiments of the invention. Computing device 110 may include internal and external hardware components, as depicted and described in further detail below with reference to FIG. 5. In other embodiments, computing device 110 may be implemented in a cloud computing environment, as described in relation to FIGS. 6 and 7, below.

Figure 5:
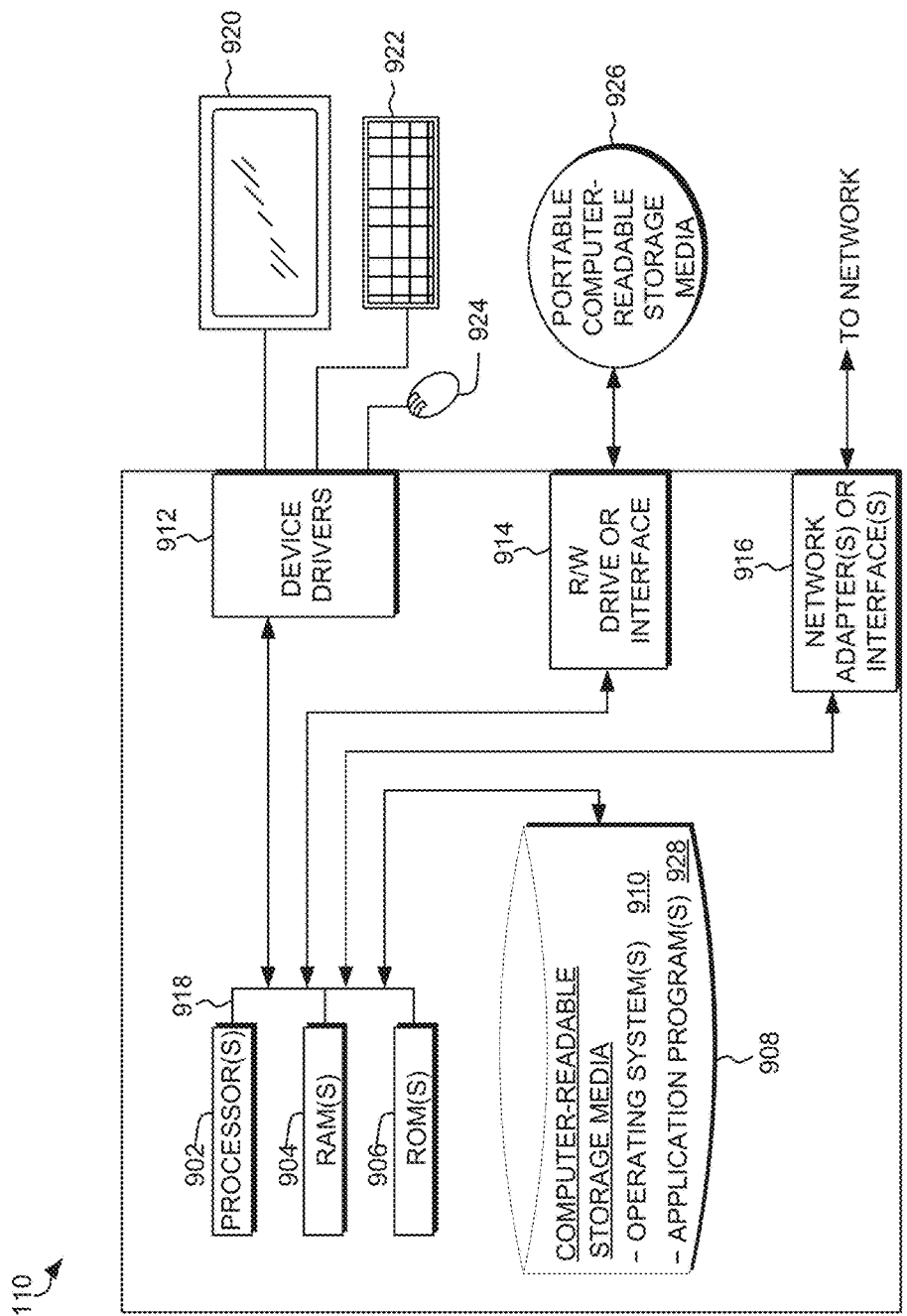
FIG. 5 is a block diagram of an exemplary computing device, according to an embodiment of the invention.

Security question datastore 120 represents a store of data associated with users' security questions, in accordance with an embodiment of the present invention. For example, security question datastore 120 may include a database of dynamic security questions and associated rules associated with specific users. Security question datastore 120 may reside, for example, on computer readable storage media 908 (FIG. 5).

In an exemplary embodiment, client computing device 126 represents a source of user credentials and related instructions that are received by computing device 110. Client computing device 126 may include graphical user interface 128, which a user may employ to generate, configure, and use a dynamic security question. In various embodiments, graphical user interface 128 may be, for example, a web browser that receives web pages transmitted by computing device 110, or dedicated applications that interface with dynamic security question program 112 on computing device 110. In other embodiments, client computing device 126 may represent another device that interfaces with computing device 110 and is required to authenticate users.

In various embodiments of the invention, a client computing device 126 may be, for example, a laptop computer, tablet computer, netbook computer, personal computer (PC), a desktop computer, a personal digital assistant (PDA), or a smart phone. In general, a client computing device 126 may be any programmable electronic device capable of communicating with computing device 110 via network 130, and of supporting functionality as required by one or more embodiments of the invention. A client computing device 126 may include internal and external hardware components as depicted and described in further detail below with reference to FIG. 5.

Network 130 can be, for example, a local area network (LAN), a telecommunications network, a wide area network (WAN), such as the Internet, a virtual local area network (VLAN), or any combination that can include wired, wireless, or optical connections. In general, network 130 can be any combination of connections and protocols that will support communications between computing device 110, security question datastore 120, client computing device 126, and the operation of dynamic security question program 112, in dynamic security question system 100, in accordance with embodiments of the present invention.

In an embodiment of the invention, computing device 110 includes dynamic security question program 112. Dynamic security question program 112 may further include security question generator 114, rule module 116, and authentication module 118.

Dynamic security question program 112 operates generally to receive information related to security questions associated with a user, in accordance with an embodiment of the invention. The information, which dynamic security question program 112 may store in security question datastore 120, may include one or more rules for generating security questions and/or answers to security questions. During authentication, dynamic security question program 112 retrieves the rules associated with the user and uses them to generate security questions and/or answers to security questions. Dynamic security question program 112 presents the user with the security questions, and the user enters answers to the security questions. If the answers entered by the user and the answers generated by dynamic security question program 112 match, the user is authenticated.

Security question generator 114 operates to generate a dynamic security question and/or an answer to a dynamic security question according to rules associated with a user and stored in security question datastore 120, in accordance with an embodiment of the present invention, as described below.

Rule module 116 allows a user to define the rules that will be used with a dynamic security question, in accordance with an embodiment of the present invention. Rule module 116 may allow the user to configure security questions and/or answers to security questions, as described below. Rule module 116 may store the rules in security question datastore 120 and associate them with the user.

In an embodiment of the invention, rule module 116 enables a user to configure the answers to dynamic security questions through rules that the user creates when configuring security for his or her account. For example, a user may supply a security question or pick a predefined question, for example, from a dropdown list. A typical example is "What is your father's middle name?". A rule governing an answer to a security question might stipulate that the answer should vary, based, for example, on contextual information associated with the user. For example, a rule may make use of contextual information such as the user's current location, certain recent transaction information (location, type, amount, etc.), the current date or time, and so on, to select an answer from a predefined set of answers.

For example, a rule that governs the answer to a dynamic security question might be: If the user's location is Phoenix, then the answer is "Alan" (father's middle name); if the location is Boston, then the answer is "Michael"; if the last transaction is greater than $5,000, then the answer is "Steven"; otherwise, the answer is "Jonathan". Other, more complicated, rules are also contemplated. For example, a rule might be: If the location is Phoenix and the time is even (i.e., the number of minutes is an even number), or the location is Boston and the time is odd, the answer is "Lynn".

In an embodiment of the invention, a rule governing an answer to a security question might specify that the answer includes a static part and one or more dynamic elements that may vary based, for example, on contextual information associated with the user. For example, a rule might specify that at a certain position, referred to as a reference character position, in a character string representing the answer, a predefined, constant string should be inserted, based on contextual information. For example, a rule for configuring the answer to the dynamic security question "What is your favorite food?" might stipulate that the answer given should be "Pizza124" if the time is even and "Pizza135" if the time is odd. That is, either the string "124" or the string "135" should be inserted at reference character position 6 in the static string "Pizza" depending on whether the time is even or odd. In various embodiments, a rule might specify multiple strings for insertion, with corresponding reference character positions.

In another example, a rule for configuring an answer to a dynamic security question might stipulate that a string representing contextual data be inserted at a predefined reference character position in a static string representing the answer. For example, a rule for configuring the answer to the dynamic security question "Where were you born?" might be "insert the current time at reference character position 3 in the static string "Detroit". For example, if at authentication the current time is 4:20 p.m., the correct answer may be "Det1620roit". In various embodiments, a rule might specify multiple contextual data strings for insertion, with corresponding reference character positions. Moreover, a rule might specify both constant strings and contextual data strings for insertion.

In an embodiment of the invention, rule module 116 enables a user to configure the security questions themselves through policies or rules that the user creates when configuring security for his or her account. For example, a rule for configuring a dynamic security question might be: If the user's location is Phoenix, then the question is "What is your favorite food?"; if the location is Boston, then the question is "In what city were you born?".

Figure 2:
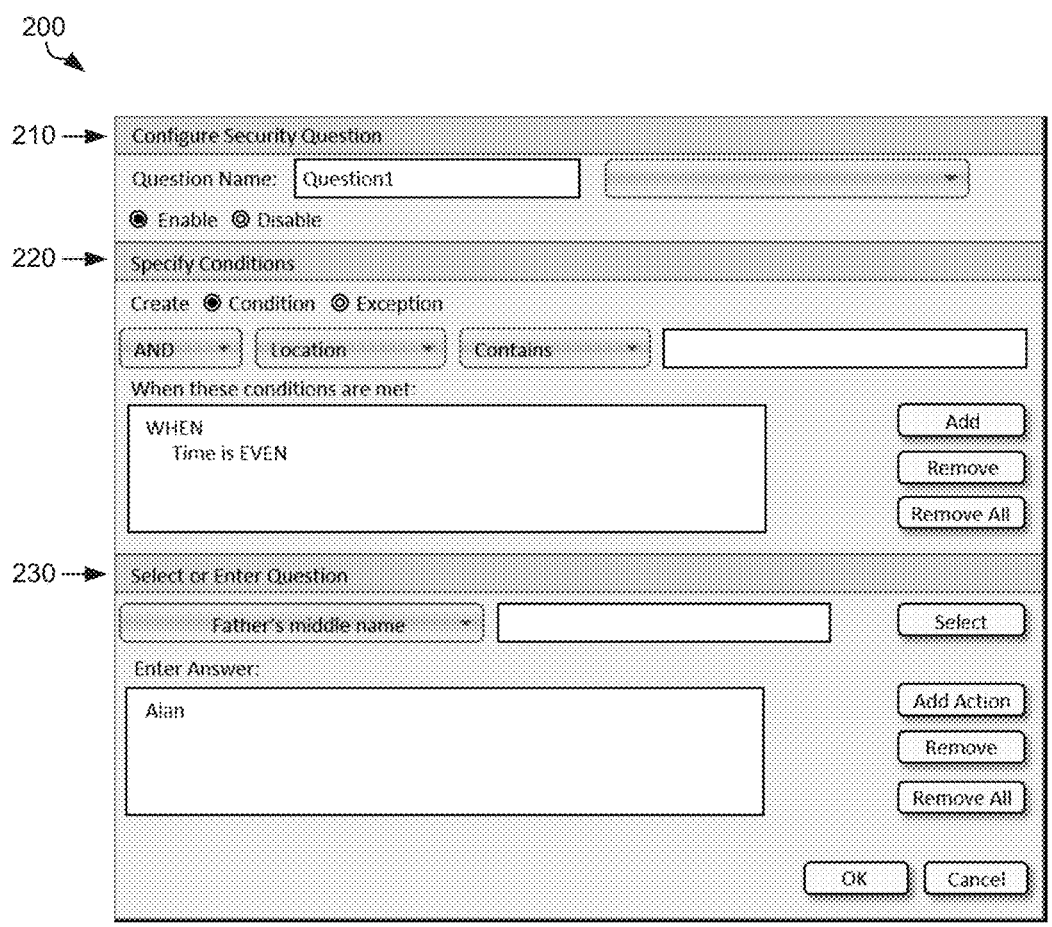
FIG. 2 is a diagram of an exemplary user interface for configuring rules in generating or using dynamic security questions, in accordance with an embodiment of the present invention.

In one embodiment of the invention, a user defines rules for a dynamic security question via rule module 116 by using a graphical user interface (GUI), such as that shown in FIG. 2, designed for this purpose. For example, a user may log onto computing device 110 via client computing device 126, and enable dynamic security question generation via a user setting. Once the setting is enabled, rule module 116 is invoked to define the rules that will be used with the dynamic security question.

Rule module 116 may facilitate the process of establishing patterns/policies by providing a GUI to customize the rules which will be used with dynamic security questions. FIG. 2 depicts an example GUI that may allow a user to establish a dynamic security question, in accordance with various embodiments of the invention.

FIG. 2 is a diagram of an exemplary user interface 200 for configuring rules in generating or using dynamic security questions, according to an embodiment of the invention. Through the exemplary user interface 200, a user can create custom rules and determine when and under what circumstances they should be applied.

FIG. 2 illustrates how a user might define an example rule via exemplary user interface 200, according to an embodiment of the invention. Configure Security Question pane 210 allows a user to assign a name to a security question, for example, Question1, and to enable it or disable it. Specify Conditions pane 220 allows the user to specify conditions under which Question1, when enabled, is to be used as a dynamic security question. Select or Enter Question pane 230 allows the user to select a predefined question from a dropdown list or to enter a custom question of the user's choosing, and to provide an answer to the question. In this case, Question1 is configured according to the rule: If the (login) time is 'even', the user is expected to provide "Alan" as the answer to the question "What is your father's middle name?".

In various embodiments, conditions for dynamic security questions may involve contextual information for a user, such as the current time, date, month, the user's location, or a pin code associated with the user. In an embodiment of the invention, a user may be presented with various options in an authentication GUI to simplify the process of providing an answer to a security question. For example, a login GUI might display the time, place, user's pin code, etc., which the user could use to generate the currently correct answer to a security question.

In accordance with an embodiment of the present invention, authentication module 118 presents a security question to a user and receives an answer to a security question from the user. Authentication module 118 compares the answer to the security question with the answer generated by security question generator 114, and authenticates the user if the two answers match.

Whenever a user defines a rule for a dynamic security question, rule module 116 may store the rule in security question datastore 120 and associate it with the user. When authentication module 118 is subsequently called on to authenticate the user, it recognizes that a dynamic security question is being used and requests that security question generator 114 retrieve the stored rules in order to generate a security question and/or answer to a security question. Authentication module 118 may allow access to the user's account, provided the received answer and the generated answer match.

Figure 3:
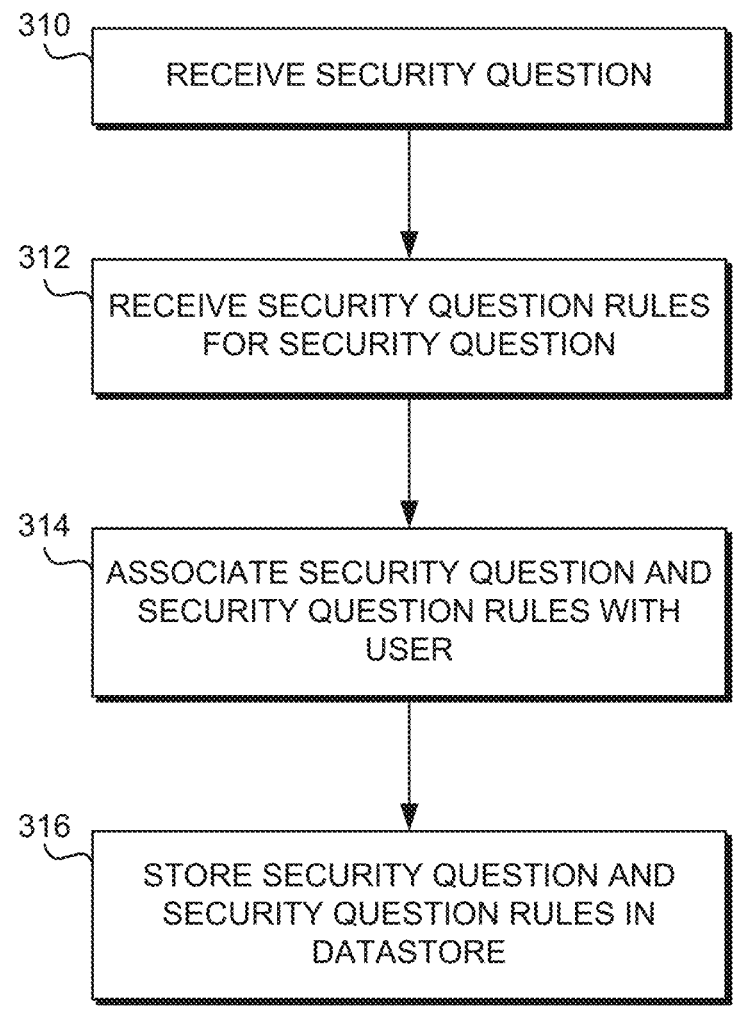
FIG. 3 is a flowchart depicting operational steps of a dynamic security question program, in accordance with an embodiment of the present invention.

FIG. 3 is flowchart depicting various operational steps performed by computing device 110 in generating a dynamic security question, in accordance with an embodiment of the invention. A user enters a security question and one or more security question rules for the security question, through a user interface on a client computing device 126. Client computing device 126 transmits the security question and the security question rules to dynamic security question program 112 on computing device 110. Dynamic security question program 112 receives the security question (step 310), and the security question rules (step 312). Dynamic security question program 112 associates the security question and the security question rules with the user (step 314). Dynamic security question program 112 stores the security question and the security question rules in security question datastore 120 (step 316).

Figure 4:
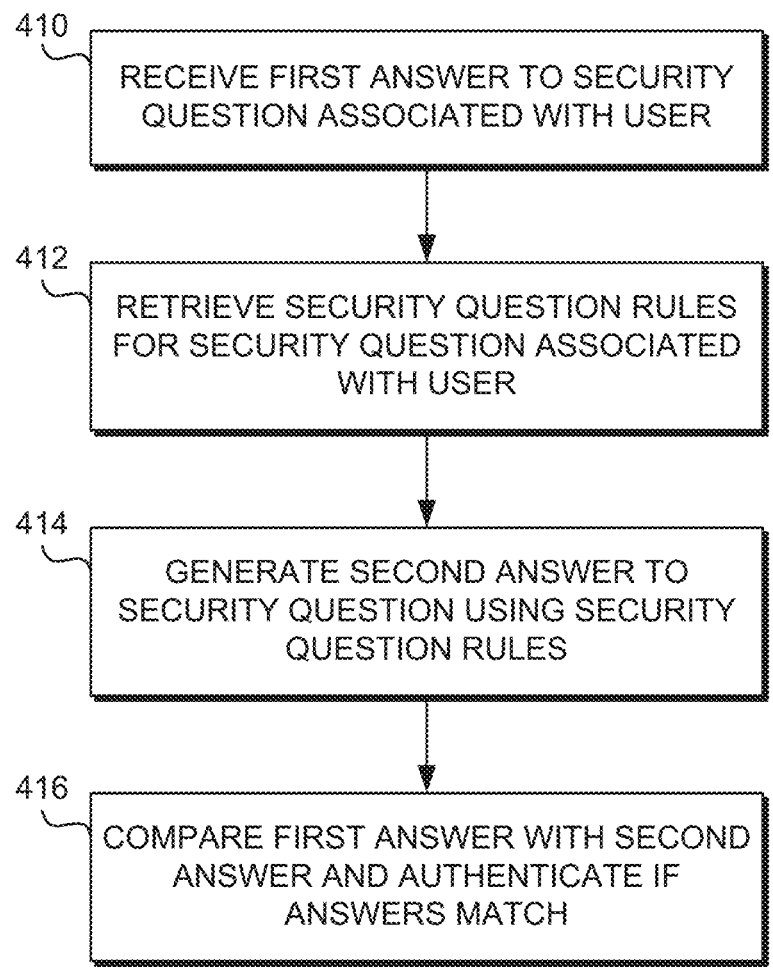
FIG. 4 is a further flowchart depicting further operational steps of a dynamic security question program, in accordance with an embodiment of the present invention.

FIG. 4 is a flowchart depicting various operational steps performed by computing device 110 in authenticating a dynamic security question, in accordance with an embodiment of the invention. A first answer to a security question associated with a user is received (step 410). Security question generator 114 retrieves security question rules for the security question, associated with the user, from security question datastore 120 (step 412). Security question generator 114 generates a second answer to the security question using the security question rules (step 414). Authentication module 118 compares the first answer, received from the user, with the second, generated, answer, and if they match, authenticates the user (step 416).

FIG. 5 depicts a block diagram 900 of components of computing device 110 (FIG. 1), in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 may also include a R/W drive or interface 914 to read from and write to one or more portable computer readable storage media 926. Application programs 928 on client computing devices and/or computing device 110 may be stored on one or more of the portable computer readable storage media 926, read via the respective R/W drive or interface 914 and loaded into the respective computer readable storage media 908.

Computing device 110 may also include a network adapter or interface 916, such as a TCP/IP adapter card or wireless communication adapter (such as a 4G wireless communication adapter using OFDMA technology). Application programs 928 on computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
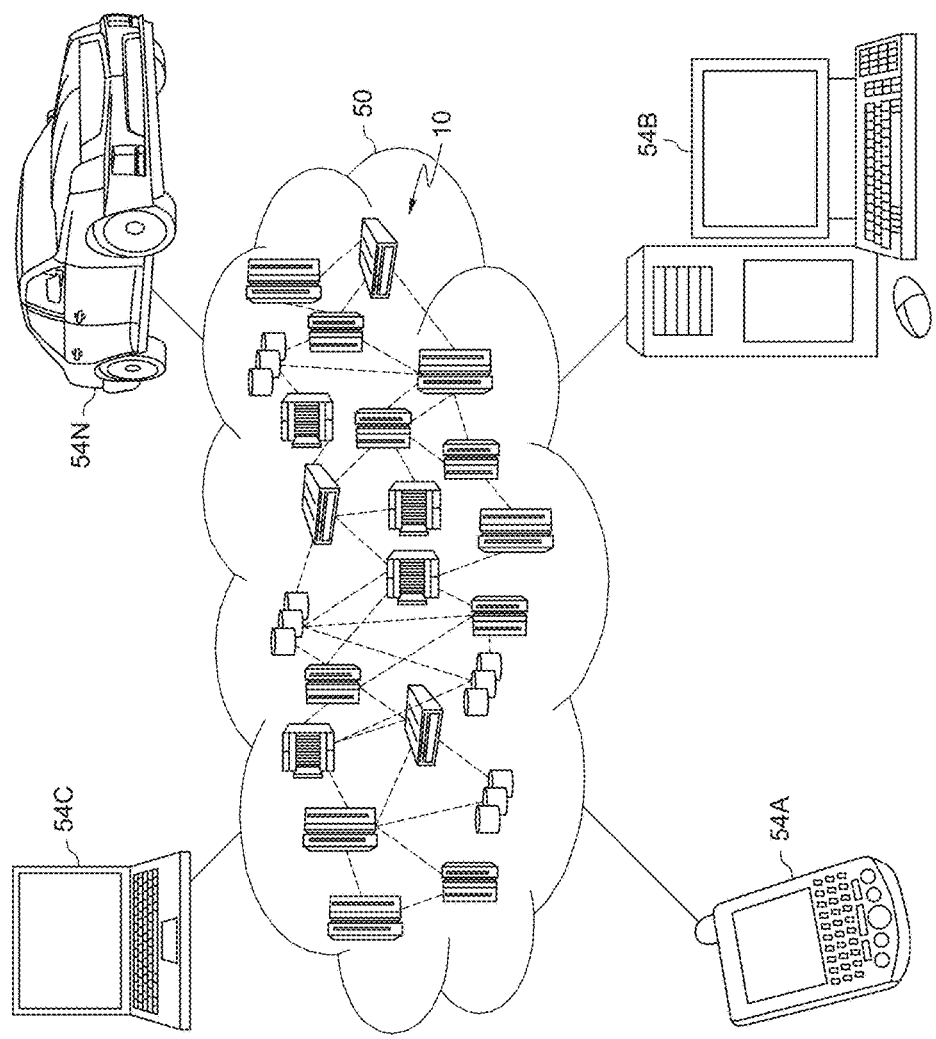
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 7:
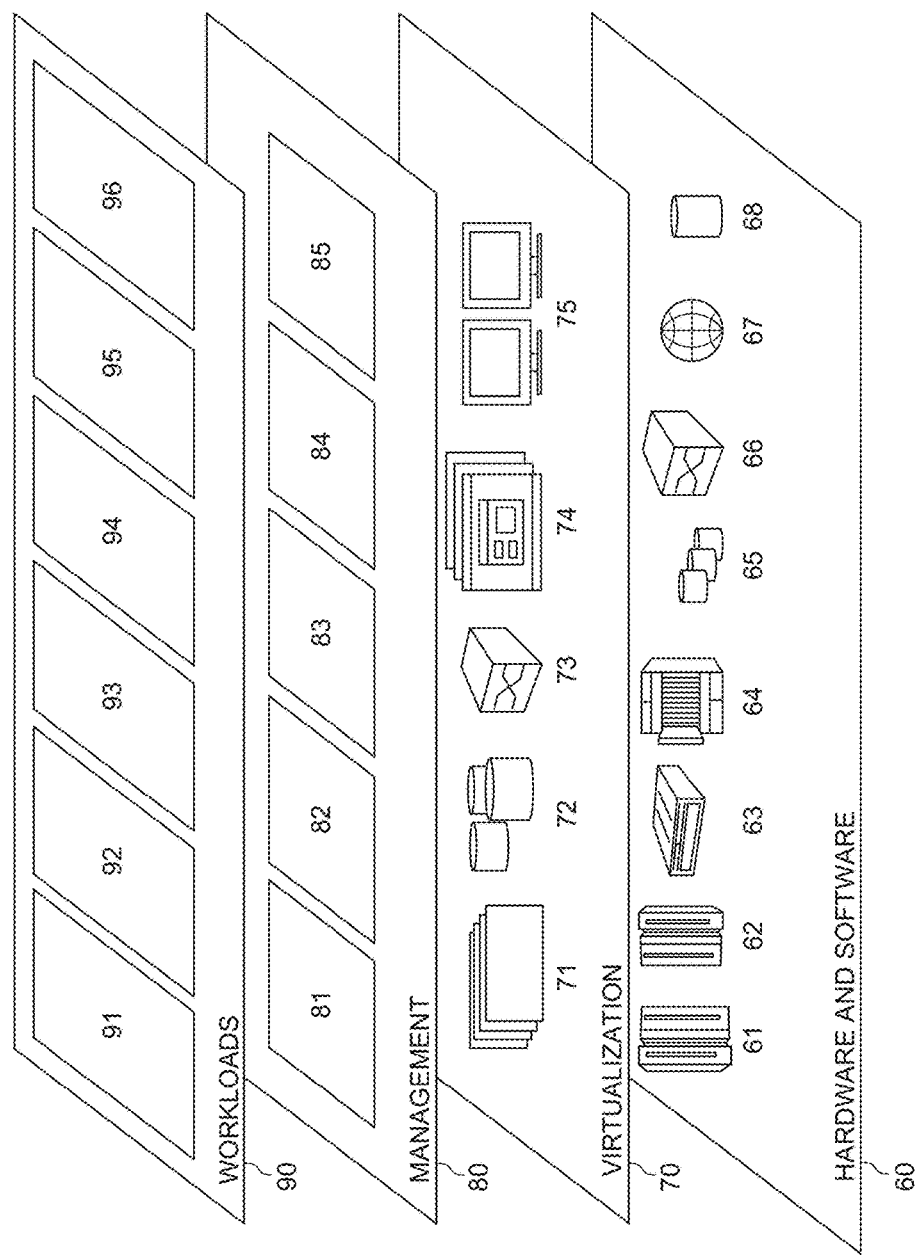
FIG. 7 depicts abstraction model layers of the cloud computing environment of FIG. 6 according to an embodiment of the present invention.

Referring now to FIG. 7, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic security question program 96.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer-implemented method for providing access to an electronic account, the method comprising:

receiving, by a first computer from a second computer over a network, in response to information entered into a graphical user interface (GUI) displayed on the second computer, a plurality of security questions and, for each security question, a plurality of answers and one or more rules for generating a security question from the plurality of security questions and an answer from the plurality of answers, wherein the one or more rules determine which of the security questions to generate based on first contextual information associated with the user, which answer to generate based on second contextual information associated with the user, the rules specifying the at least one answer of the plurality of answers include one or more dynamic elements based upon a time in a number of minutes associated with the user, the dynamic elements varying based upon the second contextual information associated with the user, and the GUI allows the user to disable each security question;

storing, by the first computer, the security questions, the answers, the rules for generating a security question, an answer, a name for each security question assigned by the user, and whether each security question is disabled in a database, whereby the security questions, the answers, and the rules for generating a security question and an answer are associated with additional security credentials of the user; and in response to receiving, by the first computer from the second computer over the network, via information entered into the GUI on the second computer, a request to provide access to an electronic account associated with the user:

retrieving, by the first computer, from the database, the plurality of security questions, the plurality of answers, and the rules for generating a security question for each security question not disabled and an answer;

generating, by the first computer, a security question, based on the retrieved rules and the first contextual information associated with the user;

generating, by the first computer, a first answer to the generated security question, based on, the retrieved rules, and the second contextual information associated with the user;

transmitting, by the first computer, the generated security question to the second computer via the network;

receiving, by the first computer from the second computer over the network a second answer to the generated security question based on information entered into the GUI on the second computer displaying a time to the user including a number of minutes for the user to generate a currently correct answer of the plurality of answers;

determining, by the first computer, that the first answer matches the second answer; and granting, by the first computer, the second computer access to the electronic account, based on the additional security credentials of the user.

2. A method in accordance with claim 1, wherein the first computer is selected from the group consisting of a mobile computing device and a cloud computing node.

3. A method in accordance with claim 1, wherein the rules for generating a security question from the plurality of security questions and an answer from the plurality of answers comprise rules for selecting a question from a set of predefined questions and an answer from a set of predefined answers.

4. A method in accordance with claim 1, wherein the second contextual information is configured by the user when configuring security to the electronic account, the first contextual information associated with the user and the second contextual information associated with and defined by the user each comprise one or more information selected from the group consisting of:
   a current location of the user, a location of a recent transaction, a type of recent transaction, and recent transaction amount.

5. A computer system in accordance with claim 1, wherein the GUI is a dedicated application and interfaces with a dynamic security question program on the first computer.

6. A computer system in accordance with claim 1, wherein the GUI allows the user to specify conditions under which each security question is to be used as a dynamic security question with a specify conditions pane in the GUI.

7. A computer system in accordance with claim 1, wherein the GUI allows the user to log on to disable dynamic security question generation via a user setting.

8. A method in accordance with claim 1, wherein the one or more rules specify the static part and the one or more dynamic elements are represented within a character string.

9. A method in accordance with claim 8, wherein the one or more rules specify that multiple dynamic elements are inserted at multiple reference character positions in the character string.

10. A method in accordance with claim 8, wherein at least one of the one or more dynamic elements are based upon whether a time is even or odd, a time odd when a number of minutes is odd and even when the number of minutes is even.

11. A method in accordance with claim 1, wherein the one or more rules specify the at least one answer of the plurality of answers includes a static part and two or more dynamic elements that vary based upon the second contextual information associated with the user, the static part and the two or more dynamic elements represented within the character string, each of the two or more dynamic elements inserted in the string based upon different numeric reference character positions.

12. A computer system for providing access to an electronic account, the computer system comprising:
   one or more computer processors, one or more non-transitory computer-readable storage media, and program instructions stored on the one or more non-transitory computer-readable storage media, which when executed cause at least one of the one or more processors to perform a method, comprising:
   receiving, by a first computer from a second computer over a network, in response to information entered into a graphical user interface (GUI) displayed on the second computer, a plurality of security questions and, for each security question, a plurality of answers and one or more rules for generating a security question from the plurality of security questions and an answer from the plurality of answers, wherein the one or more rules determine which of the security questions to generate based on first contextual information associated with the user, which answer to generate based on second contextual information associated with the user, the rules specifying the at least one answer of the plurality of answers include one or more dynamic elements based upon a time in a number of minutes associated with the user, the dynamic elements varying based upon the second contextual information associated with the user, and the GUI allows the user to disable each security question;
   storing, by the first computer, the security questions, the answers, the rules for generating a security question, an answer, a name for each security question assigned by the user, and whether each security question is disabled in a database, whereby the security questions, the answers, and the rules for generating a security question and an answer are associated with additional security credentials of the user; and
   in response to receiving, by the first computer from the second computer over the network via information entered into the GUI on the second computer, a request to provide access to an electronic account associated with the user:
      retrieving by the first computer, from the database, the plurality of security questions, the plurality of answers, and the rules for generating a security question for each security question not disabled and an answer;
      generating, by the first computer, a security question, based on the currently correct answer, the retrieved rules, and the first contextual information associated with the user;
      generating, by the first computer, a first answer to the generated security question, based on the retrieved rules and the second contextual information associated with the user;
      transmitting, by the first computer, the generated security question to the second computer via the network;
      receiving, by the first computer from the second computer over the network a second answer to the generated security question based on information entered into the GUI on the second computer displaying a time to the user including a number of minutes for the user to generate a currently correct answer of the plurality of answers;
      determining, by the first computer, that the first answer matches the second answer; and
      granting, by the first computer, the second computer access to the electronic account, based on the additional security credentials of the user.

13. A computer system in accordance with claim 12, wherein the rules for generating a security question from the plurality of security questions and an answer from the plurality of answers comprise rules for selecting a question from a set of predefined questions and an answer from a set of predefined answers.

14. A computer system in accordance with claim 12, wherein the second contextual information is configured by the user when configuring security to the electronic account, the first contextual information associated with the user and the second contextual information associated with and defined by the user each comprise one or more information selected from the group consisting of:
   a current location of the user, a location of a recent transaction, a type of recent transaction, and recent transaction amount.

15. A computer system in accordance with claim 12, wherein the second computer is selected from the group consisting of a mobile computing device and a cloud computing node.

16. A computer system in accordance with claim 12, wherein the GUI is a web browser.

17. A computer system in accordance with claim 12, wherein the GUI allows the user to specify conditions under which each security question is to be used as a dynamic security question with a specify conditions pane in the GUI.

18. A computer system in accordance with claim 12, wherein the GUI allows the user to log on to disable dynamic security question generation via a user setting.

\* \* \* \* \*